United States Patent Office

3,314,908
Patented Apr. 18, 1967

3,314,908
EMULSION POLYMERS OF A 2-METHYL ALPHA OLEFIN AND A DIALKYL FUMARATE
George M. Kagan, Fords, and Alfred L. Miller, Cranford, N.J., assignors to Esso Research and Engineering Company, a corporation of Delaware
No Drawing. Filed July 1, 1964, Ser. No. 379,731
16 Claims. (Cl. 260—29.6)

The present invention relates to improved interpolymerization products formed by the polymerization of 2-methyl alpha olefins with a dialkyl fumarate ester system. More particularly, the invention deals with a water base paint composition wherein a polymer of a 2-methyl alpha olefin and a mixed dialkyl fumarate ester system serves as the paint vehicle.

The aqueous emulsion polymerization of 2-methyl alpha olefins such as isobutylene with a single fumaric ester such as diethyl fumarate is well known in the art. For example, Hopff and Steinbrunn in U.S. 2,182,316 disclose the interpolymerization of isobutylene with diethyl fumarate to form hard rigid polymers. It has been found however that the polymers of Hopff and Steinbrunn are not suitable as latex paint vehicles as the polymer is generally a hard glassy material that is too brittle to be used as a surface coating.

Now, in accordance with this invention, it has been found that when a 2-methyl alpha olefin such as isobutylene is polymerized with a mixed dialkyl fumarate ester system in aqueous emulsion in the presence of polymerization catalyst, a flexible, non-tacky polymer suitable as a paint vehicle is secured. High molecular weight polymeric materials are obtained by conducting the polymerization reaction at moderate temperatures and pressures.

The alpha olefin monomer employed in the present polymers consists of at least one aliphatic 2-methyl alpha monoolefin having from 4 to 9 carbon atoms, and more preferably from 4 to 6 carbon atoms. Representative non-limiting examples of useful $C_4$ to $C_9$ aliphatic 2-methyl alpha monoolefins are: isobutylene or 2-methyl-1-propene; 2-methyl-1-pentene; 2-methyl-1-hexene; 2-methyl-1-heptene; and 2-methyl-1-octene. The preferred aliphatic 2-methyl alpha monoolefin is isobutylene, because it is commercially available in large quantities at very low cost.

The fumaric ester component of the present emulsion polymers must contain the proper alkyl functionality in order to obtain polymer suitable as paint vehicles. For example, copolymers formed from fumaric esters having only $C_1$ to $C_3$ alkyl functionality are found to be extremely hard and brittle. Similarly, polymers formed from fumaric esters having only the $C_4$ to $C_{18}$ alkyl functionality are unsuitable as paint vehicles as the resulting polymers tend to be soft and tacky.

It has been found that hard yet tough surface coating films can be obtained if the alkyl functionality is introduced into the polymer by utilizing a dialkyl fumarate ester system consisting of either a mixed dialkyl fumarate ester having the general formula:

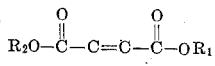

wherein $R_1$ is a $C_1$ to $C_3$, preferably $C_2$, alkyl radical and $R_2$ is a $C_4$ to $C_{18}$, preferably $C_4$ to $C_8$, alkyl radical or a mixture of dialkyl fumarate esters wherein 5 to 95 mole percent of the mixture is a dialkyl $C_1$ to $C_3$, preferably $C_2$, fumarate ester, e.g. diethyl fumarate and 95 to 5 mole percent of the mixture is a dialkyl $C_4$ to $C_{18}$, preferably $C_4$ to $C_8$, fumarate ester, e.g. dioctyl fumarate.

Representative examples of useful mixed dialkyl fumarate esters include: methyl amyl fumarate; methyl heptyl fumarate; ethyl butyl fumarate; ethyl hexyl fumarate; propyl 1-methylbutyl fumarate; 1-methylethyl nonyl fumarate; methyl decyl fumarate; ethyl dodecyl fumarate; and 1-methylethyl cetyl fumarate. The mixed esters useful in the present invention can be obtained by reacting fumaric acid with a mixture of alcohols in a desired proportion. Long chain alcohols having from 10 to 18 carbon atoms can be obtained by the hydrogenation of coconut oil or beef tallow.

Mixtures of fumarate esters that are suitable monomers for the formation of the improved copolymers of the present invention include: dimethyl fumarate and dibutyl fumarate; diethyl fumarate and dibutyl fumarate; dipropyl fumarate and dihexyl fumarate; diisopropyl fumarate and diheptyl fumarate; diethyl fumarate and di(methylbutyl) fumarate; dimethyl fumarate and dioctyl fumarate; dipropyl fumarate and didodecyl fumarate; and diisopropyl fumarate and ditetradecyl fumarate.

Small amounts of alpha beta unsaturated mono or dicarboxylic acids can be interpolymerized with the 2-methyl alpha olefin and mixed dialkyl fumarate ester system. Incorporation of minor amounts, 1 to 5 wt. percent of the dicarboxylic acid into the polymer serves to stabilize the polymer in emulsion. Examples of useful acids are fumaric acid, acrylic acid, methacrylic acid, maleic acid, itaconic acid, etc.

The polymerization of the 2-methyl alpha olefins and the dialkyl fumarate ester system is carried out by dispersing the monomers in water in the presence of a suitable emulsifying agent and, after the addition of a suitable polymerization catalyst, heating until the polymerization is completed. Suitable emulsifying agents are the polyethoxylated alkyl phenols such as Igepal CO 997; ethoxylated phenols such as ethoxylated octyl phenol such as Triton X-100; potassium oleate; sodium lauryl sulphate; and sodium alkyl benzene sulfonates. The catalyst system employed in preparing the polymers of this invention may be any organic or inorganic redox catalyst system. Examples of useful redox catalysts are sodium or potassium persulfate in combination with either benzoin or sodium metabisulfite.

The conditions under which the polymerization reaction is conducted can vary over a wide range. Generally, temperatures ranging from —5° C. to 95° C. can be used; however, temperatures ranging from 1 to 30° C. are preferred. Pressures ranging from 15 to 250 p.s.i. can be employed in the polymerization reaction; however, pressures in the range of from about 1 atmosphere to 50 p.s.i. are more commonly used. The reaction times used in the formation of the polymers depend in general upon the temperature used. Generally, reaction times ranging from 8 to 120 hours are employed; however, it is more usual to use reaction times ranging from 8 to 64 hours.

The reaction vessel utilized for the polymerization can be constructed of any material that is inert to the reactants used, and is capable of withstanding the operating pressures. Reactors made of glass, stainless steel and glass-lined steel may be used.

In a typical polymerization procedure, a glass reaction vessel is charged with water, a 2-methyl alpha olefin, the dialkyl fumarate ester system, emulsifiers, and redox catalysts. Agitation of the mixture is then commenced and the total mixture is maintained at a temperature in the range of 0 to 30° C. for a period of between 8 and 64 hours. Generally, the molar ratio of olefin to dialkyl fumarate ester system is maintained higher than 1. In applications wherein a mixture of dialkyl fumarate esters make up the fumarate ester system, the amount of dialkyl $C_1$ to $C_3$ fumarate ester may constitute about 5 to 95 mole percent of the total mixture and the dialkyl $C_4$ to $C_{18}$ fumarate ester may make up from about 95 to 5 mole percent of the total fumarate ester mixture. The total monomer concentration in the polymerization system is not critical and generally a concentration of 5 parts to 60 parts, preferablyy 30 parts to 60 parts, by weight, based upon the total reaction mixture, can be employed.

The amount of emulsifier necessary to maintain the 2-methyl alpha olefin and dialkyl fumarate monomers in emulsion with the water diluent can vary over a wide range. Generally, however, 1 to 5 parts by weight of the emulsifier is used per 100 parts by weight of monomer charged to the reaction vessel. The amount of redox catalyst used to secure the polymerization of the 2-methyl alpha olefin with the fumarate ester system will depend upon the reactivity of the monomers used. The use of about 0.01 to 6.0 parts by weight, preferably 0.01 to 20 parts by weight, of catalyst per 100 parts of olefin and ester serves to secure acceptable yields of polymer. The molar ratio of reducing component to oxidizing component in the redox catalyst system can vary in the range of from about 0.1 to 3.0.

Following the completion of the polymerization reaction, the total reaction mixture is steam distilled to remove any unreacted 2-methyl alpha olefin and dialkyl fumarate ester. The resulting product, consisting mainly of polymer emulsion, can be directly used as a paint vehicle by methods known in paint technology. The polymer products thus obtained are tough, flexible solids that are saturated and exhibit viscosity average molecular weights ranging from about 5,000 to 300,000. The polymers so produced contain about 45 to 55 mole percent 2-methyl alpha olefin and about 55 to 45 mole percent of the fumarate ester system. Where a mixture of fumarate esters make up the dialkyl fumarate ester system, the $C_1$ to $C_3$ dialkyl fumarate ester may make up about 5 to 95 mole percent and the $C_4$ to $C_{18}$ dialkyl fumarate ester may constitute about 95 to 5 mole percent of the ester portion of the polymer. Polymers containing approximately equal molar amounts of 2-methyl alpha olefin and fumarate ester have been found to be highly durable exterior paint vehicles. When the polymers of the present invention are used as paint vehicles, the polymer can make up from 5 to 95 wt. percent of the total paint composition.

In addition to the polymers used as latex paint vehicles for interior or exterior applications, the polymers may also be used as paper coatings, paper saturants, rug backing binders, concrete additives, and also as binders for non-woven fabrics and fiber glass strands.

This invention and its advantages will be better understood by reference to the following examples:

EXAMPLE 1

Into a glass reaction vessel was introduced 135 grams of water. To the water was then added equimolar amounts of dibutyl fumarate (41.0 grams) and diethyl fumarate (31.0 grams). To the reaction vessel was then introduced 5.30 grams of a soduim lauryl sulfate emulsifier and the polymerization catalyst system consisting of 0.25 gram of potassium persulfate, 0.25 gram of sodium metabisulfite, and 0.25 gram of morpholine. Gaseous isobutylene was then cooled to a temperature below its boiling point, weighed, and 60 grams of the chilled 2-methyl alpha olefin was introduced into the reaction vessel. The reaction vessel was then sealed and placed in a water bath maintained at a temperature of 50° C. The reaction vessel was tumbled slowly in a water bath for a period of 40 hours at which time the polymerization reaction was substantially complete.

The total reaction mixture was then steam distilled to remove excess isobutylene and any unreacted diethyl and dibutyl fumarate. Based upon reacted fumarate ester, a yield of 81% was secured. Following the steam distillation, the resulting emulsion was found to contain 41.4 wt. percent non-volatile matter, the non-volatile matter being primarily emulsion polymer containing minor amounts of the polymerization catalyst.

The polymer obtained contained respectively about 50 mole percent isobutylene, 25 mole percent diethyl fumarate and 25 mole percent dibutyl fumarate.

EXAMPLE 2

To a glass reaction vessel was charged 243 grams of water, 109 grams (1.94 moles) of liquid isobutylene, 122 grams (0.54 mole) of dibutyl fumarate, 19.25 grams (0.11 mole) of diethyl fumarate, and 3.60 grams (0.037 mole) of maleic anhydride. To the mixture of monomers and water was then added 1.18 grams of polyethoxylated nonylphenol (4 moles ethylene oxide), 1.49 grams of polyethoxylated nonylphenols (15 mole ethylene oxide), 10.45 grams of a 28% active solution of a sodium salt of alkyl aryl polyether sulfonate, 0.90 gram of ammonium persulfate, 0.76 gram of sodium metabisulfite, and 2.70 grams of sodium bicarbonate.

The total mixture was then maintained at a temperature of 25° C. under continuous agitation for a period of 86 hours. At the completion of the reaction period, the unreacted monomers were removed from the reaction mixture and a polymer-water emulsion containing 41.7% non-volatile matter was secured.

The polymer component of the emulsion consisted of about 50.2 mole percent isobutylene, 8.2 mole percent diethyl fumarate, 39.3 mole percent dibutyl fumarate, and 2.3 mole percent maleic acid.

EXAMPLE 3

To a glass reaction vessel containing about 150 cc. of water is added 0.3 mole of diisopropyl fumarate and 0.05 mole of didodecyl fumarate. About 2 grams of an emulsifier, potassium oleate, and a redox catalyst system consisting of potassium persulfate (0.25 gram) and benzoin (0.25 gram) and a low temperature initiator, morpholine are then introduced into the reaction vessel. To this mixture is added about 1 mole of 2-methyl-1-pentene.

The total mixture is then agitated to disperse the reactants into the water diluent. The reaction vessel is then sealed, and the vessel and its contents are maintained at a temperature of about 40° C. for a period of 60 hours under continuous agitation.

At the completion of the reaction, an emulsion is obtained of a tough, flexible 2-methyl-1-pentene/diisopropyl fumarate/didodecyl fumarate film-forming polymer.

EXAMPLE 4

To a glass reaction vessel containing about 150 cc. of water is added 0.4 mole of ethylbutyl fumarate. About 3 grams of an emulsifier, sodium lauryl sulfate, a redox catalyst system consisting of 1.0 gram of a 30% solution of hydrogen peroxide and 0.2 gram ferrous sulfate heptahydrate are then introduced into the reaction vessel. To this mixture is added about 1.2 moles of 2-methyl-1-butene.

The total mixture is then agitated to disperse the reactants into the water diluent. The reaction vessel is then closed, and the vessel and its contents is maintained at a temperature of about 25° C. for 80 hours under continuous agitation.

From the resulting milky liquid the interpolymerization product formed is precipitated by the addition of hydrochloric acid, filtered off by suction and washed with distilled water. After drying, there is obtained a flexible polymer of 2-methyl-1-butene and ethyl butyl fumarate.

EXAMPLE 5

To a glass reaction vessel containing about 200 cc. of water is added 0.5 mole of methyldecyl fumarate. About 4 grams of a sodium alkyl benzene sulfonate surfactant and minor amounts of a redox catalyst system consisting of potassium persulfate and benzoin are then introduced into the reaction vessel. To this mixture is added about 1 mole of isobutylene.

The total mixture is then agitated by stirring to disperse the reactants into the water diluent. The reaction vessel is then closed, and the vessel and its content is maintained at a temperature of 60° C. for a period of 30 hours under continuous agitation.

At the completion of the reaction, the resulting emulsion provides a tough, flexible polymer of isobutylene and methyldecyl fumarate that is suitable as a latex paint vehicle.

EXAMPLE 6

To demonstrate the effectiveness of the emulsion polymers of the present invention as latex paint vehicles, two paints were prepared based upon (1) the isobutylene/diethyl fumarate/dibutyl fumarate emulsion polymer of Example 1 and (2) a commercial acrylate emulsion polymer known as Rhoplex AC–34, manufactured by the Rohm & Haas. To determine the durability of each of the paints, southern yellow pine panels were primed with a single coat of a commercial primer recommended for latex paint at a spreading rate of 330 sq. ft. per gallon of primer. The primer panels then received one coat of the latex paint at a spreading rate of 400 sq. ft. per gallon. The dried, painted panels were then exposed in an Atlas, Model 18–WR Weatherometer. The relative durability of each of the paints was determined by reflectometer readings.

The formulation of the pigment base used in both of the paint compositions is set forth in Table I below.

TABLE I

| Components: | Grams |
|---|---|
| Water | 1620 |
| Potassium tripolyphosphate | 10 |
| Ethylene glycol | 250 |
| Phenyl mercuric acetate (30% solution) | 30 |
| Rutile titanium dioxide | 2250 |
| Calcium carbonate (coarse) | 1000 |
| Clay (ASP–400) | 500 |
| Hydroxyl ethyl cellulose (1.25% aqueous solution) | 2000 |
| Defoamer | 20 |
| Beta-ethoxyethyl acetate | 100 |
| Alkyl aryl sulfonate surfactant | 40 |

A portion of the above pigment formulation was then individually mixed with the polymer of Example 1 and with a commercial acrylate emulsion polymer. The amount of polymer used in both paints was in sufficient quantities such that each paint had a 40% pigment volume concentration. Pigment volume concentration is defined as the volume of pigment solids in the paint divided by the volume of pigment solids plus the volume of polymer solids in the paint X 100.

Both paint compositions were then subjected to weatherometer tests to determine the durability of the paints. The results of the tests are set forth in Table II below.

TABLE II

[2,500 Hour Weatherometer Exposure Comparison]

| | Commercial Acrylate Polymer | Isobutylene/dibutyl fumarate/diethyl fumarate polymer |
|---|---|---|
| ΔE Color Difference [1] [2] | 31.5 | 24.1. |
| Visual Observation | Color deepened considerably. | Color deepened slightly. |

[1] Expressed as Judd units, color measurements made on exposed and unexposed panels. The greater the ΔE value the greater the color difference and the more undesirable is the result.
[2] R. S. Hunter, J. Opt. Soc. Am., Vol. 48, No. 12, 985–995, December 1958.

The above test indicates that the emulsion polymer of Example 1 is a highly durable latex paint vehicle and exhibits color retention characteristics that are superior to the color retention properties displayed by the acrylate-based paint composition.

Further advantages of this invention will be apparent to those skilled in the art. Paints that exhibit excellent durability characteristics can be directly prepared from the polymers of the present invention. It is to be understood that this invention is not limited to the specific examples set forth herein which have been offered merely as illustrations and that modifications may be made without departing from the spirit and scope of the appended claims.

What is claimed is:

1. An emulsion polymer comprising about 45 to 55 mole percent of a $C_4$ to $C_9$ 2-methyl alpha olefin and about 55 to 45 mole percent of a dialkyl fumarate ester system selected from the group consisting of a mixed dialkyl fumarate ester having the general formula:

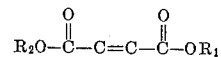

wherein $R_1$ is a $C_1$ to $C_3$ alkyl radical and $R_2$ is a $C_4$ to $C_{18}$ alkyl radical and a mixture of dialkyl fumarate esters comprising 5 to 95 mole percent of a dialkyl $C_1$ to $C_3$ fumarate ester and 95 to 5 mole percent of a dialkyl $C_4$ to $C_{18}$ fumarate ester.

2. The polymer of claim 1 wherein said 2-methyl alpha olefin is isobutylene.

3. The polymer of claim 1 wherein said ester system is a mixture of diethyl fumarate and dibutyl fumarate.

4. The polymer of claim 1 wherein said ester system is ethyl butyl fumarate.

5. An emulsion polymer comprising at least about 50 mole percent of isobutylene and at least about 50 mole percent of a dialkyl fumarate ester system consisting of 5 to 95 mole percent of diethyl fumarate and 95 to 5 mole percent of dibutyl fumarate.

6. The polymer of claim 5, wherein said polymer consists of about 50 mole percent isobutylene, 25 mole percent diethyl fumarate and 25 mole percent dibutyl fumarate.

7. In an emulsion paint composition, the improvement which comprises using as a paint vehicle an emulsion polymer comprising about 45 to 55 mole percent of a $C_4$ to $C_9$ 2-methyl alpha olefin and at least about 55 to 45 mole percent of a dialkyl fumarate ester system selected from the group consisting of a mixed dialkyl fumarate ester having the general formula:

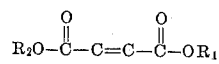

wherein $R_1$ is a $C_1$ to $C_3$ alkyl radical and $R_2$ is a $C_4$ to $C_{18}$ alkyl radical and a mixture of dialkyl fumarate esters comprising 5 to 95 mole percent of a dialkyl $C_1$ to $C_3$ fumarate ester and 95 to 5 mole percent of a dialkyl $C_4$ to $C_{18}$ fumarate ester.

8. The paint composition of claim 7 wherein said 2-methyl alpha olefin is isobutylene.

9. The paint composition of claim 7 wherein said ester system is a mixture of diethyl fumarate and dibutyl fumarate.

10. The paint composition of claim 7 wherein said ester system is ethyl butyl fumarate.

11. In an emulsion paint composition, the improvement which comprises using as a paint vehicle an emulsion polymer comprising at least about 50 mole percent of isobutylene and at least about 50 mole percent of a dialkyl fumarate ester system consisting of a mixture of dialkyl fumarate esters comprising 5 to 95 mole percent of diethyl fumarate and 95 to 5 mole percent of dibutyl fumarate.

12. The paint composition of claim 11 wherein said emulsion polymer consists of about 50 mole percent isobutylene, 25 mole percent diethyl fumarate and about 25 mole percent dibutyl fumarate.

13. The polymer of claim 1 containing from 1 to 5 wt. percent of an alpha beta unsaturated carboxylic acid.

14. The polymer of claim 13 wherein said carboxylic acid is maleic acid.

15. The composition of claim 7 wherein said emulsion polymer contains from 1 to 5 wt. percent of an alpha beta unsaturated carboxylic acid.

16. The claimed composition of claim 15 wherein said carboxylic acid is maleic acid.

References Cited by the Examiner
UNITED STATES PATENTS

| | | | |
|---|---|---|---|
| 2,182,316 | 12/1939 | Hopff et al. | 260—78.5 |
| 2,543,964 | 3/1951 | Giammaria | 260—78.5 |

SAMUEL H. BLECH, *Primary Examiner.*

MURRAY TILLMAN, *Examiner.*

J. ZIEGLER, *Assistant Examiner.*